United States Patent [19]

Messerschmitt

[11] Patent Number: 4,669,115
[45] Date of Patent: May 26, 1987

[54] HYBRID CIRCUIT AND METHOD

[75] Inventor: David G. Messerschmitt, Walnut Creek, Calif.

[73] Assignee: Regents of the University of California, Berkeley, Calif.

[21] Appl. No.: 725,508

[22] Filed: Apr. 22, 1985

Related U.S. Application Data

[63] Continuation of Ser. No. 328,440, Dec. 7, 1981, abandoned.

[51] Int. Cl.[4] .......................... H04B 1/52; H04B 3/20
[52] U.S. Cl. ..................................... 379/402; 379/410
[58] Field of Search ....... 179/170 R, 170 D, 170 NC, 179/170 T, 170.2, 170.6, 170.8

[56] References Cited

U.S. PATENT DOCUMENTS

| B 541,415 | 2/1976 | Ukeiley | 179/170 D |
|---|---|---|---|
| 3,787,645 | 1/1974 | Araseki | 179/170.2 |
| 4,057,696 | 11/1977 | Gitlin et al. | 179/170.2 |
| 4,096,362 | 6/1978 | Crawford | 179/170 D |
| 4,224,483 | 9/1980 | Neigh et al. | 179/175.2 R |
| 4,276,450 | 6/1981 | Chowaniec | 179/170.2 |
| 4,278,848 | 7/1981 | Rizzo et al. | 179/170 D |
| 4,351,060 | 9/1982 | Treiber | 179/170.2 |

OTHER PUBLICATIONS

L. Dibiaso; "Transmission Considerations for Local Switched Digital Network"; *Telephony;* Oct. 24, 1977; p. 40.

R. Bunker et al.; "Line Matching Networks to Support Zero Loss Operation in Digital Class 5 Offices"; Conference Record, Interntl. Conf. on Subscriber's Loops and Systems; Atlanta, Ga; Mar. 1978.

D. Duttweiler; "A Twelve-Channel Digital Echo Canceller"; IEEE Transactions on Communications; vol. COM-26; May 1978; p. 647.

J. Neigh; "Transmission Planning for an Evolving Local Switched Digital Network"; IEEE Transactions on Communications; vol. COM-27; Jul. 1979; p. 1019.

"Voice Frequency Transmission"; Bell System Technical Journal; Sep. 1981; pp. 1589-1599.

R. Bunker et al.; "Zero Loss Considerations in Digital Class 5 Offices"; IEEE Transactions on Communications; vol. COM-27; Jul. 1979; p. 1013.

*Primary Examiner*—Gene Z. Rubinson
*Assistant Examiner*—Randall P. Myers
*Attorney, Agent, or Firm*—Flehr, Hohbach, Test, Albritton & Herbert

[57] ABSTRACT

An adaptive hybrid circuit for use in a digital telephone switching system is disclosed. The hybrid circuit is adaptive in that it provides cancellation of a far end talker power component in an output signal having both far end talker and near end talker power components. The circuit includes first and second transfer filters for matching loaded and non-loaded subscriber loops, respectively, in the telephone system. The circuit generates a filtered signal representing the difference between loaded and non-loaded subscriber impedances in the telephone system and generates an adaptive control signal responsive to the filtered signal and the output signal such that the far end talker power component is cancelled.

8 Claims, 7 Drawing Figures

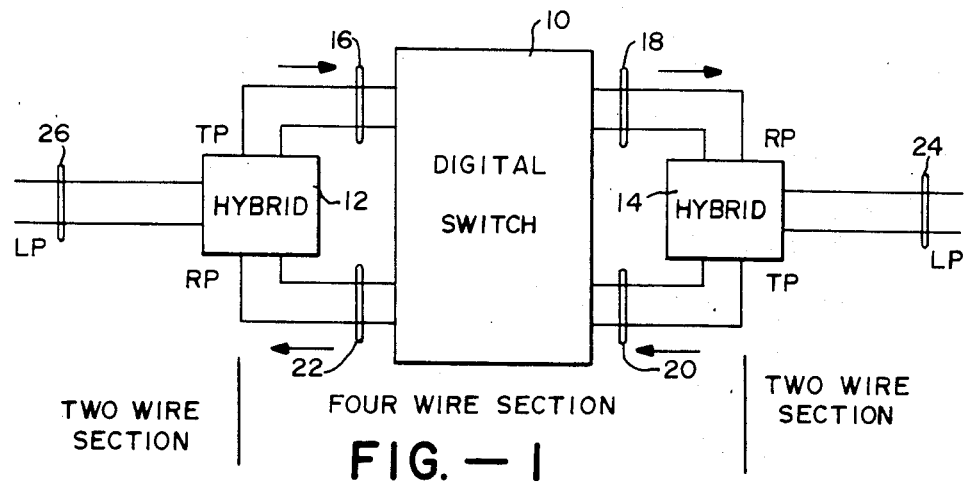
FIG.—1
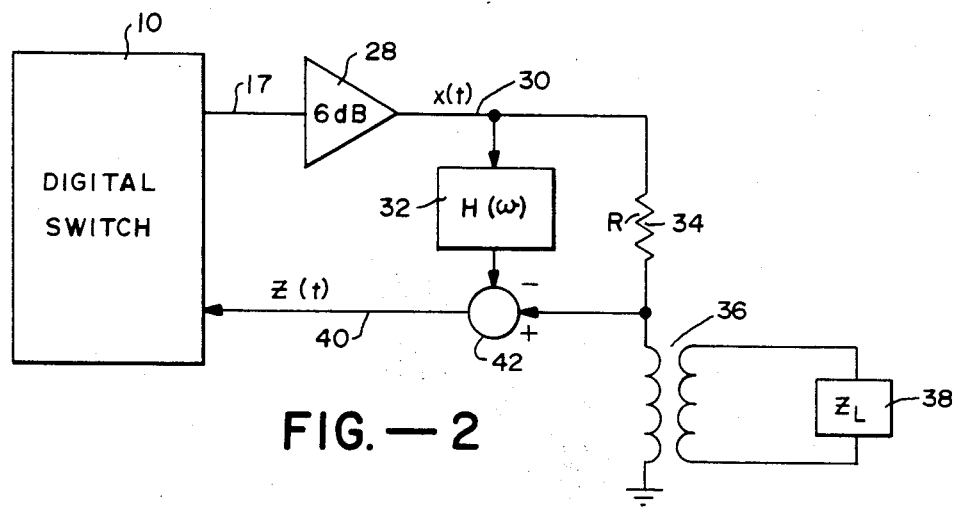
FIG.—2
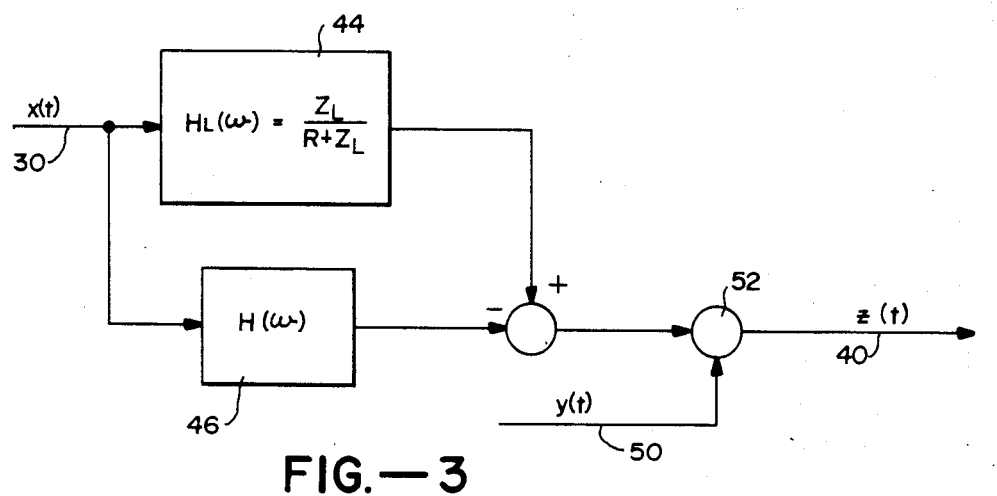
FIG.—3

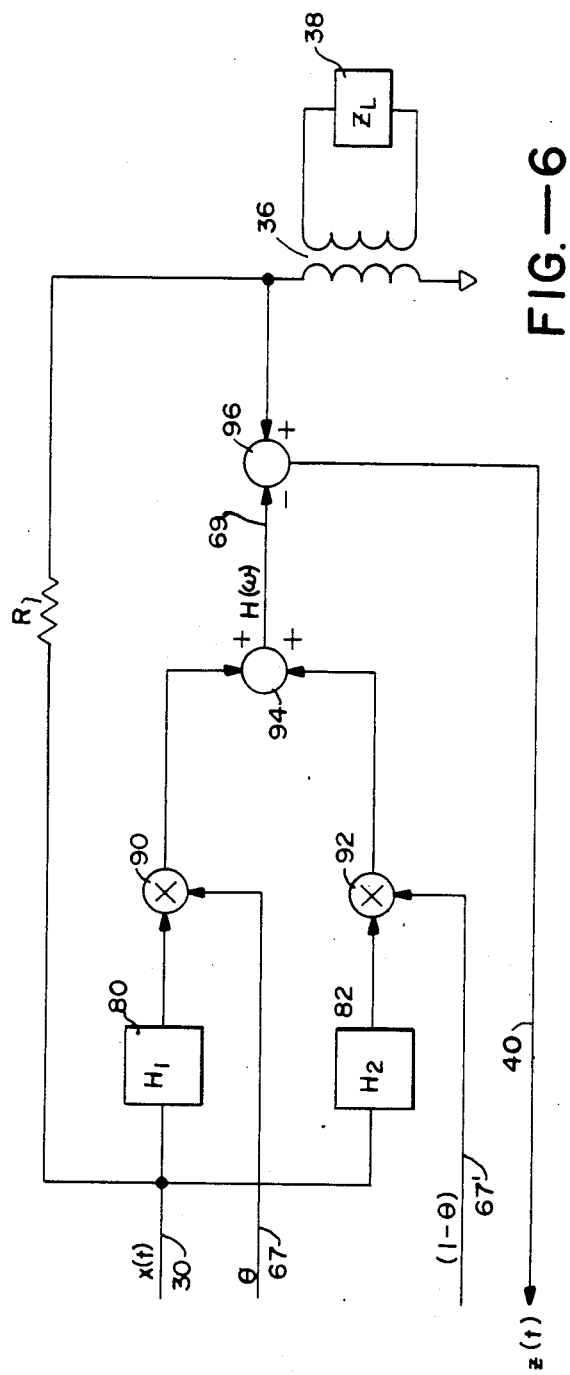
FIG.—6
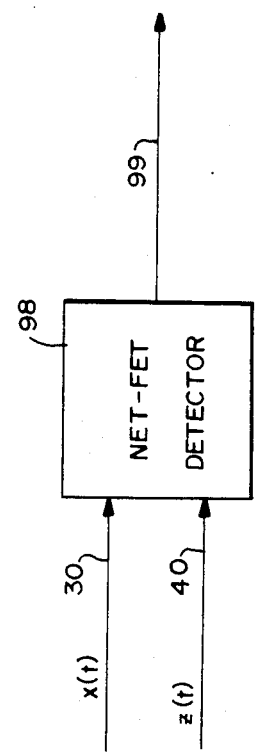
FIG.—7

HYBRID CIRCUIT AND METHOD

This is a continuation of application Ser. No. 328,440 filed Dec. 7, 1981, now abandoned.

CROSS REFERENCE TO RELATED APPLICATION

Speech Detector For Use In An Adaptive Hybrid Circuit, invented by Alejandro de la Plaza, Ser. No. 98,623, filed Nov. 29, 1979, now U.S. Pat. No. 4,275,270, and assigned to the same assignee as the present invention.

BACKGROUND OF THE INVENTION

The present invention relates to a hybrid circuit and method for use in a digital switching system.

With the advent of digital switches for replacement of metallic cross-point analog switches in local telephone networks, there is a need for more accurate balancing of the hybrid circuit used for two-wire to four-wire conversion. This need arises because the four-wire local switch, which was formerly two-wire, would ideally have zero dB insertion loss, as does the switch it replaces, whereas previously four-wire transmission in the telephone network always had an associated non-zero loss, improving the singing margin.

Singing in hybrid circuits is defined as an undesired self-sustaining oscillation at a frequency in the passband of the system. Singing margin is defined as the net loss around a four-wire singing path at any frequency, or the minimum value of such loss over a range of frequencies.

One prior art approach has been to provide a switch insertion loss, usually about two dB, which adversely affects lossnoise grade of service on longer subscriber loops. Another approach is to replace the former single compromise hybrid termination with two or more terminations tailored to each type of subscriber loop design. In such an approach, two such terminations, one for loaded loops and another for unloaded loops, will result in acceptable singing margin with a zero-loss switch. Approaches to choosing these terminations have included manual switch setting from plant records and automatic setting by transmitting a tone and measuring the return loss during call set-up.

Loop segregation with manually switched terminations has an associated administrative expense, which would not be well received by telephone operating companies. Problems with transmitting a tone and measuring return loss are that the tone transmitted with the phone off-hook may annoy the customer, intervention by the switch common control and communication between the switch common control and line interface may be necessary, and continued adaptation during the course of the call is not possible but would, however, be desirable because of extensions, foreign equipment and change of line impedance, among others.

In addition, due to resonances in the impedance characteristic, measurements of impedance at a single frequency may be misleading.

Another approach is an adaptive echo canceller, which is of primary interest in satellite transmission, in that it adapts on the basis of virtually any input signal, including speech. A problem with adaptive echo cancellers is circuit complexity.

In view of the above background, it is an objective of the present invention to provide an improved hybrid circuit for use in a digital switching system.

SUMMARY OF THE INVENTION

The present invention relates to a hybrid circuit and method for use in a digital telephone switching system.

The hybrid circuit includes first and second transfer filters having respective impedances to match loaded and nonloaded subscriber loops in a telephone system. The first and second filters are connected to receive a first input signal representing a far end talker (FET) in the telephone system for generating first and second filtered signals, respectively. The hybrid circuit includes means responsive to the first and second filtered signals for generating a first control signal representing the difference between the first and second filtered signals.

The circuit also includes means for generating an output signal having components of a near end talker (NET), and desirably a small component of a far end talker (FET).

The circuit also includes means responsive to the first control signal and to the output signal for generating a second control signal representing an estimate of the difference between a variable amplification factor and the optimal value by which the output signal has a minimal far end talker power component. The circuit also includes means responsive to the second control signal for generating the variable amplification factor and means responsive to the variable amplification factor and the first and second filtered signals for generating an adaptive control signal, which is connected to the means for generating the output signals in order to cancel the far end talker power component in the output signal.

In another embodiment, a near end talker - far end talker (NET-FET) speech detector is included which detects the presence of a near end talker, the absence of a far end talker, or both, and disables adaption, thereby providing an improved hybrid circuit that can avoid the disruptive effects on adaptation of a large NET signal.

In accordance with the above summary, the present invention achieves the objective of providing an improved hybrid circuit and method for use in a digital switching system.

Other objects and features of the invention will appear from the following detailed description when taken in conjunction with the accompanying drawings.

BRIEF DESCRIPTION OF THE DRAWINGS

FIG. 1 depicts a block diagram of a digital switching system utilizing hybrid circuits.

FIG. 2 depicts a more detailed diagram of a hybrid circuit.

FIG. 3 depicts an equivalent circuit for the hybrid circuit of FIG. 2.

FIG. 6 depicts a more detailed diagram of a control circuit which forms a portion of FIG. 4.

FIG. 7 depicts a block diagram of a speech detector circuit.

DETAILED DESCRIPTION OF THE DRAWINGS

Figure 4:
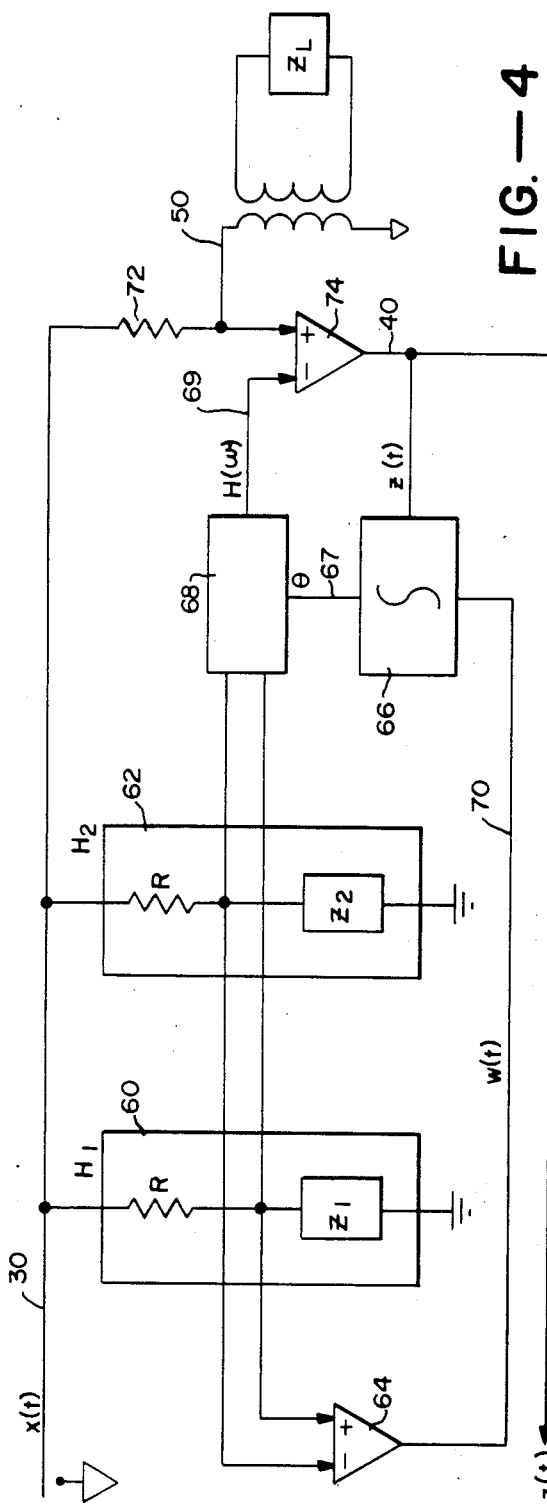
FIG. 4 depicts a diagram of an improved hybrid circuit according to the present invention.

Referring now to FIG. 1, a digital switching system is illustrated in which a digital switch 10 is connected to hybrid circuits 12, 14. The four-wire section of the digital switching system is illustrated by buses 16–22, while the two-wire sections are illustrated by buses 24 and 26. The transmit port (TP) and receive port (RP) of hybrid circuit 12 are connected to digital switch 10 by buses 16 and 22, respectively. A speech waveform is transmitted to digital switch 10 via bus 16 and received at hybrid circuit 12 via bus 22. Similarly, hybrid circuit 14 is connected to digital switch 10 via buses 18 and 20 for the respective RP and TP ports.

As is known in the art, the function of a hybrid circuit is conversion of two-wire circuits such as buses 26 or 24 to four-wire circuits such as buses 16, 22, and 18, 20.

Referring now to FIG. 2, the hybrid function is illustrated in which the subscriber loop 38, with characteristic impedance $Z_L$, is coupled to digital switch 10 through transformer 36. The transformer winding on the switch side 10 has superimposed on it both the near end talker (NET) component y(t) as well as a filtered version of the far end talker (FET) component x(t). The cancelling filter $H(\omega)$ 32 is designed to emulate the transfer function from bus 30 to the transformer 36 and thus cancel the component of x(t) which would otherwise appear in the output of the hybrid function z(t) on bus 40. The 6 dB gain circuit 28 compensates for the loss between x(t) and transformer 36. The loss is nominally 6 dB since resistor 34 is the impedance presented to the loop by the hybrid and is generally 900 ohms, the nominal loop impedance.

Referring now to FIG. 3, an equivalent circuit for the hybrid of FIG. 2 is depicted where the signal y(t) on bus 50 represents the near end talker (NET) originating on the subscriber loop. An infinite transhybrid loss is achieved if $H(\omega)$ 46 is chosen to be equal to $H_L(\omega)$ 44, but $Z_L$ is not known precisely. Nevertheless, previous work has indicated that adequate singing margin is achieved if $H(\omega)$ is chosen to be $H_1(\omega)$ or $H_2(\omega)$ where $$H_j(\omega) = \frac{Z_j}{R + Z_j}, j = 1,2 \quad [1]$$

and $Z_1$ and $Z_2$ are two impedancens chosen to match loaded and non-loaded loops. Let $$H(\omega) = \theta H_1(\omega) + (1-\theta) H_2(\omega) \quad [2]$$

where $\theta$ is a amplification factor chosen to be in the range $0 \leq \theta \leq 1$. When $\theta = 1$, $H(\omega) = H_1(\omega)$, and when $\theta = 0$, $H(\omega) = H_2(\omega)$. The proper choice if $\theta$ thus yields adequate singing margin, and the availability of values of $\theta$ between 0 and 1 yields an even better singing margin distribution. The resulting transhybrid transfer function is then $$H_{TH} = H_L(\omega) - \theta H_1(\omega) - (1-\theta) H_2(\omega) \quad [3]$$
$$= R \frac{(R+Z_1)(Z_L - Z_2) + \theta(R+Z_2)(Z_2 - Z_1)}{(R+Z_L)(R+Z_1)(R+Z_2)}$$

In order to adjust the value of $\theta$ automatically, assume x(t) and y(t) are wide-sense stationary random processes. Define the power in z(t), which is a function of $\theta$, to be $P(\theta)$, $$P(\theta) = E[z^2(t)] \quad [4]$$

The criterion for the choice of $\theta$ is to minimize $P(\theta)$ or, in other words, to minimize the power of the far end talker (FET) appearing in z(t). Since the NET power in z(t) is not dependent on $\theta$, the NET has no influence on the resulting $\theta$. The resulting $\theta$ does depend on the spectral characteristics of x(t). However, this dependence is not marked because of the severely limited degrees of freedom of the adaptive cancelling filter.

Recognizing the $P(\theta)$ is a quadratic function of $\theta$, $$P(\theta) = P(\theta_0) + K(\theta - \theta_0)^2 \quad [5]$$

where K is a constant which is a function of the spectrum of the input far end talker x(t), the unique minimizing $\theta$ is $\theta = \theta_0$, that is, $\theta_0$ is the optimal value by which the output signal z(t) has a minimal FET power component. Defining $Q(\theta)$ to be $$Q(\theta) = \frac{1}{2} \frac{dP(\theta)}{d\theta} = K(\theta_0 - \theta) \quad [6]$$

by providing a circuit to estimate $Q(\theta)$, the appropriate adjustment of $\theta$ is to increase $\theta$ if $Q(\theta) > 0$ and decrease $\theta$ if $Q(\theta) < 0$. Substituting [4] into [6]

$$Q(\theta) = \frac{1}{2} \frac{d}{d\theta} E(z^2(t)) \quad [7]$$
$$= -E\left(z(t) \frac{dz(t)}{d\theta}\right)$$
$$= E(z(t)w(t))$$

where w(t) is the output of the filter with a transfer function $(H_1(\omega) - H_2(\omega))$ and input x(t).

Referring now to FIG. 4, an adaptive cancelling filter according to the present invention is depicted in which the signal representing the far end talker x(t) on bus 30 is connected to transfer filters $H_1$ 60 and $H_2$ 62. Filter 60 includes a resistor R and impedance $Z_1$ in order to match a loaded loop, as previously described. Similarly, filter 62 has resistance R and impedance $Z_2$ chosen to match a nonloaded loop.

The filtered signals from filters 60, 62 are connected to the plus (+) and minus (−) inputs, respectively, of circuit 64, thereby forming on bus 70 the w(t) signal in accordance with equation [7], which is connected to integrating circuit 66.

The outputs of filters 60, 62 are also connected to control circuit 68, which also receives the $\theta$ signal on bus 67. Control circuit 68 generates an adaptive signal on bus 69 in accordance with equation [2].

The x(t) signal on bus 30 (representing the far end talker) is also connected together with the y(t) signal (representing the near end talker) on bus 50 to the plus (+), input of circuit 74, which receives at its minus (−) input the adaptive output on bus 69 from control circuit 68 and thereby forms the z(t) signal on bus 40, which is connected back to integrating circuit 66 and also forms the transmit output of the adaptive hybird circuit.

Figure 5:
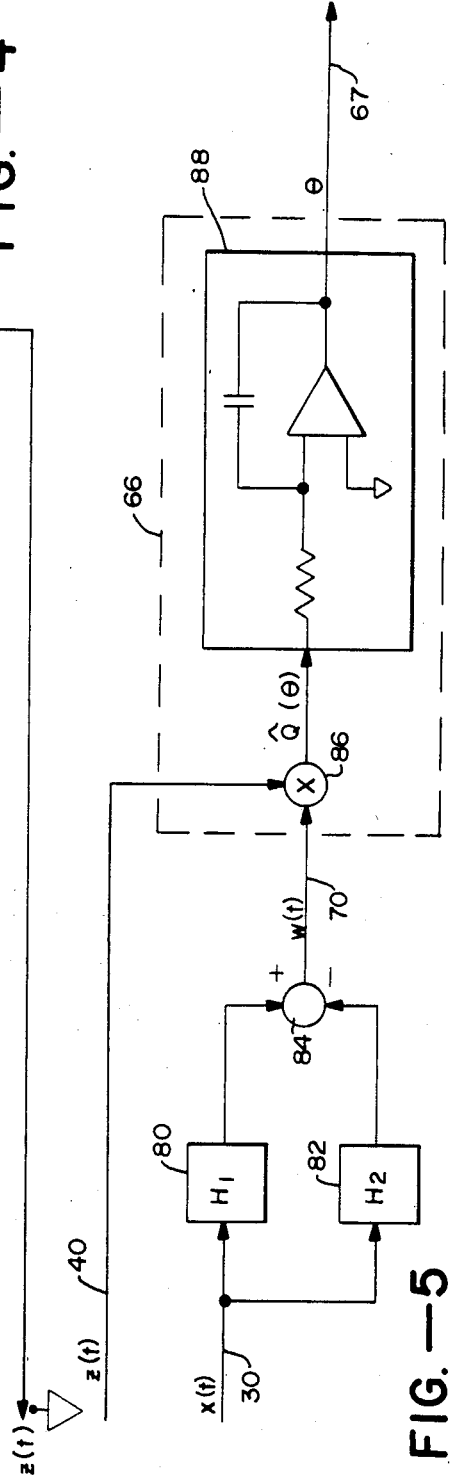
FIG. 5 depicts a more detailed diagram of an integration circuit which forms a portion of FIG. 4.

Referring now to FIG. 5, the integrating circuit 66 is depicted in further detail, in which the x(t) signal on bus 30 is connected to transfer filters 80, 82 which correspond to filters 60, 62 of FIG. 4. The filtered output signals are then connected to adder circuit 84 to form the w(t) signal (x(t)[$H_1 - H_2$]) on bus 70 which is multiplied in multiplier 86 with the z(t) signal on bus 40. The $\theta$ signal on bus 67 is formed by integrating the output of multiplier 86 in circuit 88. The resulting $\theta$ signal on bus 67 is connected to control circuit 68 of FIG. 4.

The output of multiplier 86 is an estimate of $Q(\theta)$ in equation [6] in accordance with equation [7]. If $\theta$ is other than $\theta_0$, the output of integrator 66 will be forced towrad $\theta$ by the D.C. component in $Q(\theta)$. When $\theta$ reaches $\theta_0$, the output of multiplier 86 will mean value zero, has predicted by equation [6], and the integrator output will thus remain at $\theta_0$.

Referring now to FIG. 6, the control circuit 68 of FIG. 4 is depicted in further detail in which the x(t) signal on bus 30 is connected to transfer function filters 80, 82. The filtered output of filter 80 is multiplied in multiplier 90 with the $\theta$ signal on bus 67 in accordance with equation [2]. Similarly the filtered output signal of filter 82 is multiplied in multiplier 92 with the $(1-\theta)$ signal on bus 67', which can be the complement of the $\theta$ signal appearing on bus 67.

The outputs of multipliers 90, 92 are added in adder 94 to form the $H(\omega)$ signal on bus 69 in accordance with equation [2], and is input to the subtracting input of circuit 96 together with the signal appearing from subscriber loop 38 via transformer 36. The resulting z(t) output signal on bus 40 is formed by circuit 96.

FIG. 7 depicts a near end talker - far end talker (NET-FET) detector 98 which is connected to receive the x(t) and y(t) signals on buses 30, 50 respectively. Detector 98 can be utilized with the invention depicted in FIG. 4 when continuous adaption is desired. Detector 98 determines when there is a near end speaker, no far end speaker, or both, and disables adaptation. The need for a far end speaker for adaptation to proceed is evident, but the need to disable adaptation while there is a near end speaker is because:

1. A near end speaker will directly cause a larger variance in the estimate $Q(\theta)$ since it appears in z(t), and
2. A delayed version of the near end speaker will appear in x(t) due to the presumably finite far end hybrid return loss causing an error in estimate $Q(\theta)$.

A suitable NET-FET detector is described in further detail in the cross-referenced application entitled SPEECH DETECTOR FOR AN ADAPTIVE HYBRID CIRCUIT, the details of which are hereby incorporated by reference.

In the present invention, a simpler circuit implementation will result if either w(t) or z(t), or both, is hard-limited. More particularly, it is recommended that w(t) be limited prior to cross-correlation, since limiting z(t) results in greater interaction between the NET and the adaptation.

In summary, by including first and second transfer functions which match loaded and non-loaded loop impedances, the present invention provides sufficient degrees of freedom for the subscriber loop application, yet the limitation to two degrees of freedom (as contrasted to a much larger number with an echo canceller) not only saves hardware but also has considerable benefits in improving the worst case return loss and preventing initial oscillation. Also, the implementation of a single adaptation parameter $\theta$ yields further consequential reduction in hardware. Rather than a pair of four quadrant multipliers to multiply $\theta$ and $(1-\theta)$, a much simpler variable duty cycle switch is possible as a result of the choice at a single adaptation parameter $(\theta)$ and the corresponding complement $1-\theta$, and the fact that both of them are in the range 0 to 1. By limiting w(t) and not z(t) prior to multiplication, multiplier 84 of FIG. 5 can be replaced by two switches since w(t) is equal to $\pm 1$. Finally, by providing a NET-FET detector, continuous adaptation is possible with the present invention.

What is claimed is:

1. In a hybrid circuit having input signals on one portion of a four-wire path and output signals on a second portion of said four-wire path for use in a telephone system where said input signals include far end user signals, and where said output signals include near end user signals and can include components of said far end user signals in the form of an echo, said hybrid circuit including means for converting said near end and far end user signals between a two-wire oath and said four-wire path, where said two-wire path terminates in a subscriber loop having a certain characteristic impedance, the apparatus comprising first transfer filter means having a first impedance and responsive to said far end user signals for generating a first control signal, second transfer filter means having a second, different impedance and responsive to said far end user signals for generating a second control signal, means responsive to said first and second control signals for generating a third control signal representing an echo replica of said far end user signals, and adaptation means responsive to said first and second control signals, said near end user signals and said third control signal for adaptively cancelling said far end user component of said output signals, if present.

2. A circuit as in claim 1 wherein said first impedance corresponds to a loaded subscriber loop and wherein said second impedance corresponds to a non-loaded subscriber loop.

3. A circuit as in claim 2 wherein said near end user signals represent near end talker signals and wherein said far end user signals represent far end talker signals.

4. A circuit as in claim 3 wherein said first and second transfer filter means are responsive to said far end talker signals on a first pair of wires of said four-wire path for generating said first and second control signals, respectively.

5. A circuit as in claim 4 wherein said adaptation means include differential means responsive to said first and second control signals for generating a fourth control signal representing the difference between said first and second signals.

6. A circuit as in claim 5 including integrating means responsive to said fourth control signal and to said near end talker signal on a second pair of wires of said four-wire path for generating a fifth control signal.

7. A circuit as in claim 6 wherein said fifth control signal is adaptable between a range of values between 1 and 0.

8. A circuit as in claim 7 wherein said adaptation means include means responsive to said first and second control signals and to said fifth control signal for generating said third control signal representing a transhybrid transfer function.

* * * * *